United States Patent [19]

Holly

[11] Patent Number: 5,458,827
[45] Date of Patent: Oct. 17, 1995

[54] METHOD OF POLISHING AND FIGURING DIAMOND AND OTHER SUPERHARD MATERIAL SURFACES

[75] Inventor: Sandor Holly, Woodland Hills, Calif.

[73] Assignee: Rockwell International Corporation, Seal Beach, Calif.

[21] Appl. No.: 240,427

[22] Filed: May 10, 1994

[51] Int. Cl.$^6$ .................................................... B29C 71/04
[52] U.S. Cl. ................................................................. 264/400
[58] Field of Search .............................. 264/25; 51/323

[56] References Cited

U.S. PATENT DOCUMENTS

| | | | |
|---|---|---|---|
| 4,188,122 | 2/1980 | Massie et al. | 356/349 |
| 4,498,773 | 2/1985 | Von Bieren | 356/360 |
| 5,154,023 | 10/1992 | Sioshansi | 51/323 |

OTHER PUBLICATIONS

S. M. Pimenov et al., "UV laser processing of diamond films: effects of irradiation conditions on the properties of laser treated diamond film surfaces," Diamond and Related Materials 2(1993) 291–297.

Yoshikawa, "Development and performance of a diamond film polishing apparatus with hot metals," SPIE vol. 1325 Diamond Optics III (1990) p. 210.

Jin et al., "Shaping of diamond films by etching with molten rare–earth metals," AT&T Bell Laboratories.

Harker et al., "The Polishing of polycrystalline diamond films," SPIE vol. 1325 Diamond Optics III (1990) p. 222.

Thrope et al., "Growth, polishing, and optical scatter of diamond thin films," SPIE vol. 1325 Diamond Optics III (1990) p. 230.

Jin et al., "Massive thinning of diamond films by a diffusion process," *Appl. Phys. Lett.* 60(16) 20 Apr. 1992 (p. 1948).

Jin et al., "Polishing of CVD diamond by diffusional reaction with manganese powder" Diamond and Related Materials 01 (1992) 949–953.

*Primary Examiner*—Christopher A. Fiorilla
*Attorney, Agent, or Firm*—George A. Montanye; Harry B. Field; Steven E. Kahm

[57] ABSTRACT

A method of shaping and polishing the surface of a polycrystalline diamond including the steps of diffusion smoothing the diamond surface with hot reactive metals, shaping the smoothed diamond surface by laser ablation using a pulsed laser beam, and ion-beam assisted polishing the ablated diamond surface to optical smoothness. The polished diamond can be used for high quality optics.

1 Claim, No Drawings

METHOD OF POLISHING AND FIGURING DIAMOND AND OTHER SUPERHARD MATERIAL SURFACES

BACKGROUND OF THE INVENTION

1. Field of the Invention

A method of configuring a diamond surface to a desired shape and polishing said diamond by use of a combination of diffusion smoothing, laser ablation controlled in real time by an interferometer and ion beam-assisted polishing.

2. Description of the Related Art

In the past, optical surfaces were ground and polished by artisans using techniques handed down through the generations. In more recent times, modern computer controlled cutting tools such as single point diamond turning machines and improved materials for cutting have been introduced such that the surface shapes of the optics could be approximated very closely by very fine controlled changes in the position of the cutting tool and then polishing the surface of the optics to smooth out ridges and roughness on the surface and thereby improve the optical scattering properties of the optic.

Beginning in the mid 1980s, various low-pressure Chemical Vapor Deposition (CVD) methods have been developed to produce diamond films and since then, the material quality has improved to the point that now CVD diamond can be used in demanding optical applications. Diamonds are highly transparent to light from the deep ultraviolet throughout the visible and infrared spectra. It is highly desirable to use diamond for optics and for other purposes due to its superior mechanical, thermal, and chemical properties, but diamond being the hardest material known, is difficult to shape and polish. Diamonds produced by current CVD methods are polycrystalline plates. The surface is rough and has to be shaped and polished to be useable in most applications. For high-quality optical components, the surface imperfections must be on the order of 1/100 of a wave length or less. Traditional means of producing lenses and other optic surfaces do not work with diamonds.

Many means have been proposed to smooth the surface of diamonds to make them useful in optics and other applications which require a smooth surface. These methods include polishing by conventional mechanical polishing with diamond dust, by reaction with oxygen or other gases, by laser ablation, by argon or other ion-beam irradiation, by hot metal lapping, and by electron discharge. However, some of these methods may result in inefficient diamond material removal, some of them may cause excessive and uneven etching and pitting and are either very expensive, extremely slow, or produce a rough surface having a low optical quality. Most importantly, none of the currently available diamond polishing methods assure an accurate surface figure.

SUMMARY OF THE INVENTION

A three-step method of figuring and polishing diamond surfaces was developed. First, a rough crystalline CVD diamond surface undergoes a diffusion smoothing step using a reaction of carbon with a choice of hot reactive materials such as molten rare earth metals, hot iron, or maganese materials to reduce the roughness of the surface. Next, a laser polishing and figuring step follows, where a pulsed laser beam with high peak power precision shapes the surface by ablating the diamond surface in an interferometrically control led manner, and at the same time, further reducing the surface roughness. Then an ion-beam assisted super polishing step is used to obtain as smooth a surface as necessary for the application.

OBJECTS OF THE INVENTION

To shape a diamond surface to the desired figure or shape.

To highly polish the surface of a previously precision figured diamond surface.

To obtain high quality and accurate optical surfaces on diamond.

Other objects, advantages, and novel features of the present invention will become apparent from the following detailed description of the invention when considered in conjunction with the accompanying drawing.

DETAILED DESCRIPTION OF THE PREFERRED EMBODIMENT

CVD diamond growth yields faceted top surfaces with a peak-to-valley height variation as much as 50–100 μm. A typical CVD diamond surface is also warped, due to built up stress in the material. The goal is to make the diamond surface both to conform to a prescribed shape such as being flat or spherical and also to make this precision-shaped surface as smooth as required.

In order to shape the surface and remove the roughness on the surface, a three-step process is employed. In the first step, a chemical diffusion method is used which removes a substantial portion of the rough edges and points of the polycrystalline surface by chemically dissolving the diamond, resulting in smoothing the sharp edges of the surface. There are several procedures currently available for this step. In a paper titled "Polishing of CVD Diamond by Diffusional Reaction with Manganese Powder," by S. Jin, a. E. Graebner, T. H. Tiefel, G. W. Kammlott, and G. J. Zydzik of AT&T Bell Laboratories, published in *Diamond and Related Materials* 01 (1992) pages 949–953 by Elsevier Science Publishers B. V., which is hereby made a part hereof and incorporated herein by reference, the diffusional surface smoothing reaction was accomplished using a layer of manganese powder on the CVD diamond surface. The CVD diamond plate and the manganese powder were placed between two alumina plates and maintained under a constant pressure of 200 lb./in.$^2$ to enhance the contact between the metal powder and the diamond surface. This assembly was then placed in a vacuum chamber, evacuated to about 1 mTorr and backfilled with argon (or other inert) gas several times, heated to 900° C. for 48 hours under a flowing (inert) gas atmosphere and then cooled. The diamond plate was then etched in a 50% HCl solution for about 5 minutes for cleaning. The carbon of the diamond is soluble in manganese. The sharp edges of the facets of the polycrystalline diamond surface are largely eliminated by this procedure. Although Manganese was used in this example, other reactive materials such as Iron, Nickel, Cerium, and Lanthanum have been used. Several other papers have been published disclosing ways to use a diffusion process to smooth undesirable rough edges on the surface of diamond films. Rare earth metals such as Cerium and Lanthanum have been used to smooth a diamond film surface as reported in a paper titled "Shaping of Diamond Films by Etching with Molten Rare-Earth Metals," by S. Jin, G. E. Graebner, M. McCormack, T. H. Tiefel, A. Katz, and W. C. Dautermont-Smith of AT&T Bell Laboratories. Other papers such as "Massive Thinning of Diamond Films by a Diffusion Process," by S. Jin, J. E. Graebner, G. W. Kammlott, T. H. Tiefel, S. G. Kosinski, L. H. Chen, and R. A. Fastnacht, *Appl. Phys. Lett.* 60 (16), Apr. 20, 1992 and "Development and Performance of a Diamond film Polishing Apparatus with Hot Metals," by Masanori Yoshikawa, *SPIE* Vol. 1325 *Diamond Optics III* (1990) pages 1948–1950, have disclosed diffusion reaction of hot iron with diamonds. All of the above articles are hereby made a part hereof and incorporated herein by reference.

The second step in the process is laser figuring and polishing where laser ablation of the diamond surface is actively coupled with in situ surface measuring laser interferometery to produce a surface figure of the desired shape and to further reduce roughness to further enhance surface smoothing which was initiated by the diffusion smoothing step earlier.

For shaping the diamond into a flat, spherical, cylindrical, or aspheric surface, a process of laser ablation is used which is similar to the operation of a computer-controlled lathe or a single-point diamond turning machine wherein the laser makes cuts at very small, microscopic increments to approximate the desired surface of a lens or a flat or other shape. In order for the desired shape to be formed, the diamond surface is continuously monitored at the point on the surface, where the ablation takes place. This is accomplished with a laser pencil beam electronic interferometer as in Von Bieren (U.S. Pat. No. 4,498,773), Massie et al. (U.S. Pat. No. 4,188,122), or any number of other patents as the technology is well understood to those skilled in the art. The Von Bieren and Massie et al. patents cited above are hereby made a part hereof and incorporated herein by reference. By use of a pencil beam interferometer, the laser ablating process can be electronically controlled, since the interferometer measures on a continuing basis, the diamond material removal and makes this information available to control the diamond ablating laser parameters. In this manner, the ablation laser beam can be used like the tool bit tip of a single-point diamond turning production machine. A UV excimer KrF laser operating at $\lambda=247$ nm is a possible selection for a laser used to ablate the surface. Another possible selection for a laser to ablate the surface is a Q-switched pulsed YAG laser, operating at its second or fourth harmonic wavelength. The focused laser beam is conditioned to provide uniform intensity distribution over a small (for example, rectangular) spot on the diamond surface, such as a 100 μm square spot size. The beam intensity (energy per pulse), pulse duration, and pulse repetition rate are some of the main controlling laser parameters for ablation to remove material to the desired depth as dictated by the control signal from the interferometer electronics. In this way, the desired shape of the diamond surface can be fashioned, as well as further reducing roughness beyond that provided by the diffusion surface smoothing method. One method of using the laser in conjunction with the interferometer is to turn the diamond plate as a lathe would turn a workpiece and have the laser and interferometer at a fixed position, moving only radially with respect to the rotation axis of the spinning diamond plate. Another preferred configuration is to control an x-y coordinate stage carrying the diamond plate to be figured and have a fixed position for the laser and interferometer. A three-beam, pencil-beam interferometer may be used. The first interferometric beam in this arrangement would monitor the depth of an earlier ablation cut groove for reference, the second beam would measure the surface as it is being ablated, and the third beam monitors the height of the surface that will be ablated next. The difference between the (final) depth of the already cut groove (the first beam) and the depth of the surface being ablated, (the second beam) yields how much more material is to be removed to reach the final depth of the groove. This information may be used to control the number of pulses per mm of travel of the diamond carrying stage. The objective is to have the ablated groove bottoms, when completed, to lie on the ideal surface sought. The difference between the height of the surface to be ablated (the third beam) and the depth of the final groove bottom already ablated (the first beam) yields the information about how much material needs to be removed which, when put in a control loop, can be made for example to control the energy (in Joules per pulse) of the laser beam. In this manner, the diamond surface is fashioned to the desired shape. This systematic spatially controlled ablation process of the diamond surface shapes the surface and further reduces the surface roughness over the diffusion smoothing step.

An article by S. M. Pimenov, A. A. Smolin, V. G. Ralchenko, V. I. Konov, S. V. Likhanski, and I. A. Veselovski of the General Physics Institute of the Russian Academy of Sciences and G. A. Sokolina, S. V. Bantsekov, and B. V. Spitsyn of the Institute Physical Chemistry of the Russian Academy of Sciences, titled "UV laser processing of diamond films: effects of irradiation conditions on the properties of laser-treated diamond film surfaces," Diamond and Related Materials 2 (1993), 291–297, discusses laser ablation of diamond surfaces. The article is hereby made a part hereof and incorporated herein by reference.

An article by Masanori Yoshikawa titled "Developement and performance of a diamond film polishing apparatus with hot metals," SPIE Vol. 1325 Diamond Optics III (1990), pages 210–221, shows a YAG laser ablation of a diamond surface. In this article, the laser beam axis is parallel to the diamond surface, limiting the smoothing of the surface to a few mm at most. Also, none of the laser ablation prior art in any publication describes any ablation method with (interferometric) closed-loop control. The Yoshikawa article is hereby made a part hereof and incorporated herein by reference.

The third step in the process is to polish the surface of the diamond to remove the remaining roughness down to optical quality smoothness, such that the imperfections and surface roughness (peak to valley) are typically less than 1/100 of the optical wavelength, at which the optical component is designed to be used.

To achieve this high level of polishing, a method of recently invented polishing, known as Ion Beam Assisted Polishing (IBAP) is used. This method is a patented process invented by Piran Sioshansi and assigned to the Spire Corporation (U.S. Pat. No. 5,154,023), is hereby made a part hereof and incorporated herein by reference.

In the IBAP process, the diamond surface which already has the required shape and has only submicron surface roughness of less than 1 micron peak to valley is exposed to an ion beam of Argon or Oxygen of uniform density. When the surface received an exposure dose exceeding approximately $10^{17}$ ions/cm$^2$, the top approximate 1 μm deep layer of diamond turns into amorphous carbon. This carbon layer is much softer than diamond and therefore can be polished off by using conventional abrasive (mechanical) polishing techniques. The depth to which this optical polishing progresses is self limiting, i.e., the polishing (material removal) stops when the underlying diamond material is reached.

As a result of the two prior steps of the 3-step process, the surface figure of the diamond is already accurate to within the given specifications. As a result of the whole surface consisting of adjacent parallel micro grooves of microscopic dimensions, the anticipated peak-to-valley surface roughness value is not more than 1 micron peak-to-valley; therefore, only just one or two cycles of the IBAP will be needed to achieve the desired final optical finish.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of shaping and polishing a chemically vapor deposited polycrystalline diamond surface comprising, diffusion smoothing the diamond surface to remove sharp edges of large facets of the polycrystalline diamond and to provide a first order smoothing to the diamond surface;

spatially and in-depth controlled laser ablating the diffusion smoothed diamond surface to provide an accurate shape of the diamond surface wherein said ablating includes a simultaneous laser interferometric measuring of the diamond surface for controlling said ablation; and ion-beam assisted polishing the ablated diamond surface to provide a third order smoothing of the diamond surface.

* * * * *